United States Patent
Peng et al.

(10) Patent No.: US 8,175,430 B2
(45) Date of Patent: May 8, 2012

(54) OPTICAL MULTIPLEXER/DEMULTIPLEXER SYSTEMS CONFIGURED WITH NON-PERIODIC GRATINGS

(75) Inventors: Zhen Peng, Foster City, CA (US); Nate Quitoriano, Pacifica, CA (US); David A. Fattal, Mountain View, CA (US); Raymond G. Beausoleil, Redmon, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 199 days.

(21) Appl. No.: 12/696,958

(22) Filed: Jan. 29, 2010

(65) Prior Publication Data

US 2011/0188806 A1 Aug. 4, 2011

(51) Int. Cl.
*G02B 6/34* (2006.01)
*H04J 14/02* (2006.01)

(52) U.S. Cl. ............. 385/37; 385/33; 385/14; 385/129; 385/131; 398/84; 398/87

(58) Field of Classification Search ............ 385/37, 385/33, 129, 130, 131, 132, 14, 122, 24; 398/79, 84, 87
See application file for complete search history.

(56) References Cited

U.S. PATENT DOCUMENTS

| | | | |
|---|---|---|---|
| 6,035,089 A * | 3/2000 | Grann et al. | 385/129 |
| 6,804,446 B1 * | 10/2004 | Nordin et al. | 385/132 |
| 7,050,675 B2 * | 5/2006 | Zhou | 385/37 |
| 7,693,370 B2 * | 4/2010 | Levner et al. | 385/37 |
| 2003/0007733 A1 * | 1/2003 | Levner et al. | 385/37 |
| 2011/0188806 A1 * | 8/2011 | Peng et al. | 385/37 |

* cited by examiner

*Primary Examiner* — Brian Healy

(57) ABSTRACT

Embodiments of the present invention are directed to multiplexer/demultiplexer systems. In one aspect, a multiplexer/demultiplexer system includes an input/output waveguide, two or more output/input waveguides, and a planar, non-periodic, sub-wavelength grating. The grating is configured so that when the system is operated as a multiplexer, each wavelength of light output from one of the two or more output/input waveguides is reflected by the grating toward the input/output waveguide. When the system is operated as a demultiplexer, each wavelength of light output from the input/output waveguide is reflected toward one of the two or more output/input waveguides.

15 Claims, 19 Drawing Sheets

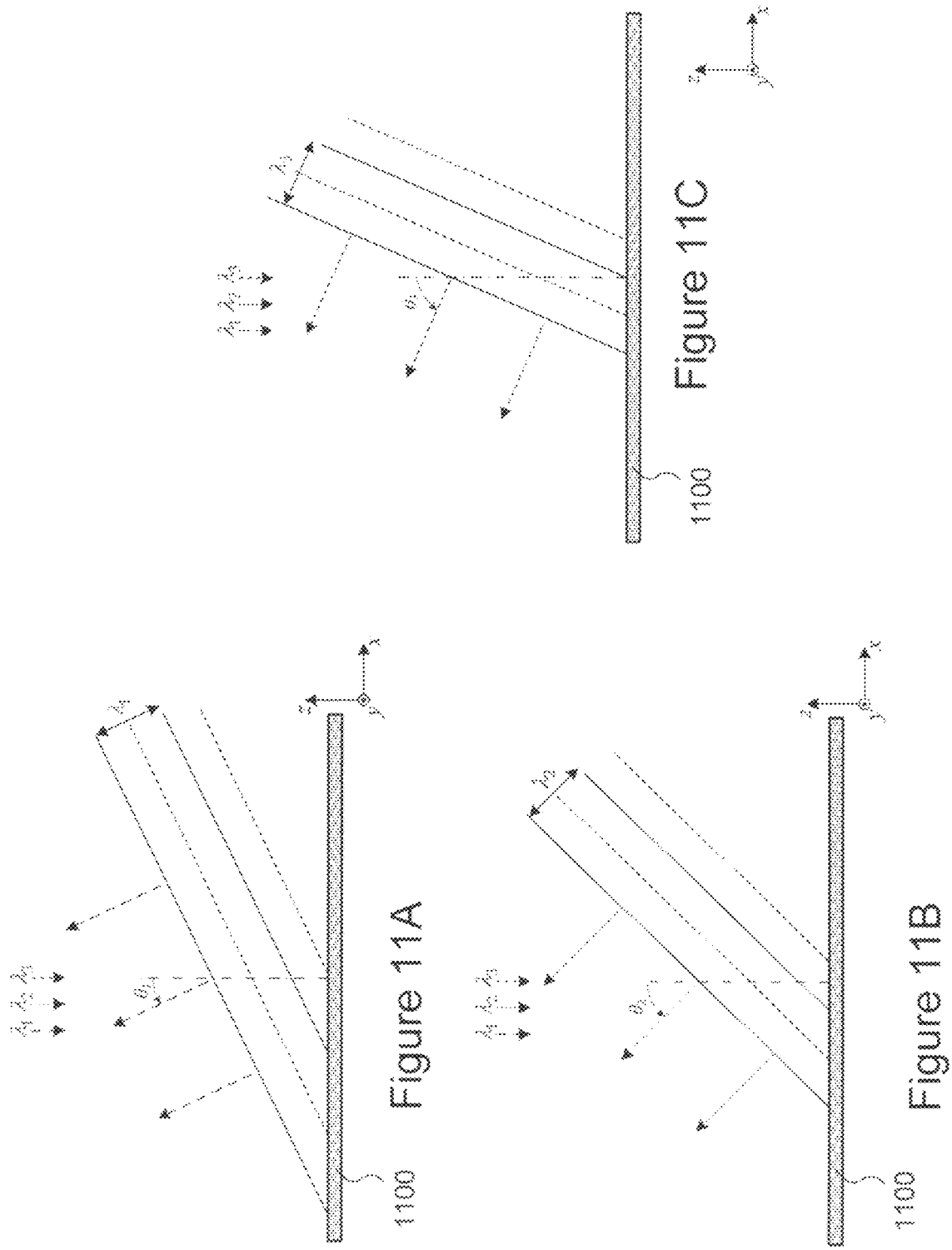

ern United States Patent Number US 8,175,430 B2

OPTICAL MULTIPLEXER/DEMULTIPLEXER SYSTEMS CONFIGURED WITH NON-PERIODIC GRATINGS

TECHNICAL FIELD

Embodiments of the present invention relate to optical multiplexers and demultiplexers.

BACKGROUND

Wavelength division multiplexing ("WDM") is a technique for transmitting separate wavelengths of light through the same optical fiber. WDM can be accomplished by first assigning an optical transmitter to each wavelength generated by one or more light sources. Each optical transmitter receives a different electronic digital signal and modulates that signal onto the assigned wavelength. A modulated wavelength is called an "optical signal" or "optical channel." Separate fibers each carry one optical signal to an optical multiplexer that combines the optical signals for transmission over the same optical fiber. If the system is designed properly, the separate optical signals do not interfere with each other while being transmitted over the same optical fiber. On the hand, a demultiplexer is a device that receives the optical signals carried by the same optical fiber and separates the optical signals for transmission on separate optical fibers or waveguides.

Arrayed waveguide gratings ("AWGs") are commonly used as optical multiplexers or demultiplexers. AWGs are capable of multiplexing a large number of wavelengths into the same optical fiber and demultiplexing a large number of optical channels carried by the same optical fiber into separate optical fibers. For demultiplexing, the optical signals are input from the same optical fiber into a first multimode section, the optical signals propagate along several single-mode waveguides to a second multimode section, and finally into output fibers. Wavelength separation is based on an interference effect and the different optical path lengths of the single-mode waveguides. The result is that each of the output fibers carries a different optical signal. Multiplexing can be accomplished by operating the AWG in reverse. In other words, each optical signal can be input to the second multimode section on a separate optical fiber, and multiplexed optical signals are output from the first multimode section on the same optical fiber.

However, typical multiplexers and demultiplexers, such as the AWG, are relatively large in size and lossy. Physicists and engineers continue to seek enhancements in multiplexer and demultiplexer design and performance.

BRIEF DESCRIPTION OF THE DRAWINGS

FIGS. 11A-11C show side views of a non-periodic, sub-wavelength grating configured to reflect light with a linearly varying wavefront in accordance with one or more embodiments of the present invention.

DETAILED DESCRIPTION

Embodiments of the present invention are directed to multiplexer/demultiplexer systems. The systems include planar, high-index, non-periodic sub-wavelength gratings ("SWGs") that are designed to reflect different wavelengths of light into different directions with low optical loss. In the following description, the term "light" refers to electromagnetic radiation with wavelengths in the visible and non-visible portions of the electromagnetic spectrum, including infrared and ultraviolet portions of the electromagnetic spectrum.

Figure 1:
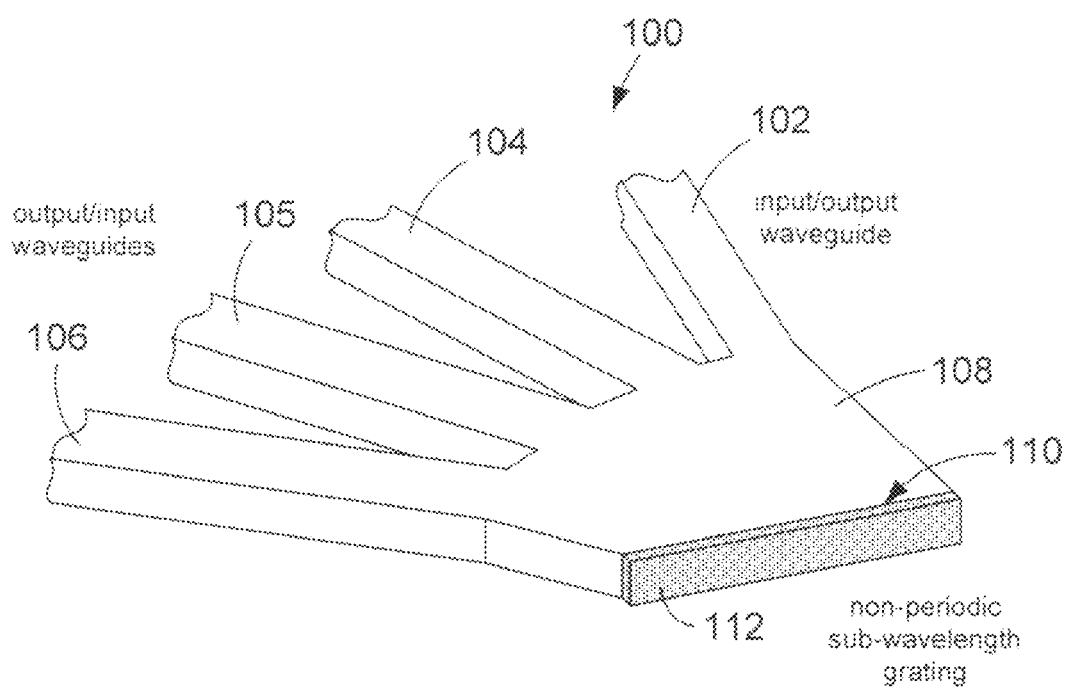
FIG. 1 shows an example of a first multiplexer/demultiplexer system configured in accordance with one or more embodiments of the present invention.

FIG. 1 shows an example of a first multiplexer/demultiplexer system 100 configured in accordance with one or more embodiments of the present invention. The system 100 includes an input/output ridge waveguide 102 and three output/input ridge waveguides 104-106. As shown in the example of FIG. 1, the waveguides 102 and 104-106 terminate at a region 108. The region 108 is continuous with the waveguides 102 and 104-106 and is configured with a planar surface 110 upon which a SWG 112 is disposed. The planar surface 110 is oriented so that the SWG 112 faces the openings of the waveguides 102 and 104-106.

The SWG 112 is configured as a reflector, as described below, so that the system 100 can be operated as a multiplexer and a demultiplexer. Note that in the following description of various embodiments, the terms "input/output" and "output/input" are used to describe how the waveguides 102 and 104-106 are used when the system 100 is operated either as a multiplexer or as a demultiplexer. When the system 100 is operated as a multiplexer, the waveguides 104-106 serve as input waveguides and the waveguide 102 serves as an output waveguide. When the system 100 is operated as a demultiplexer, the waveguide 102 serves as an input waveguide and the waveguides 104-106 serve as output waveguides.

The SWG 112 is configured so that different wavelengths of light, $\lambda_1$, $\lambda_2$, and $\lambda_3$, incident on the SWG 112 from the same direction are each reflected into different directions. The SWG 112 can also be operated in reverse such that the wavelengths $\lambda_1$, $\lambda_2$, and $\lambda_3$ are incident on the SWG 112 from the different directions are all reflected in the same direction. The configuration of the SWG 112 and the orientation of the waveguides 102 and 104-106 enable the system 100 to be operated as a multiplexer and as a demultiplexer as follows.

Figure 2A:
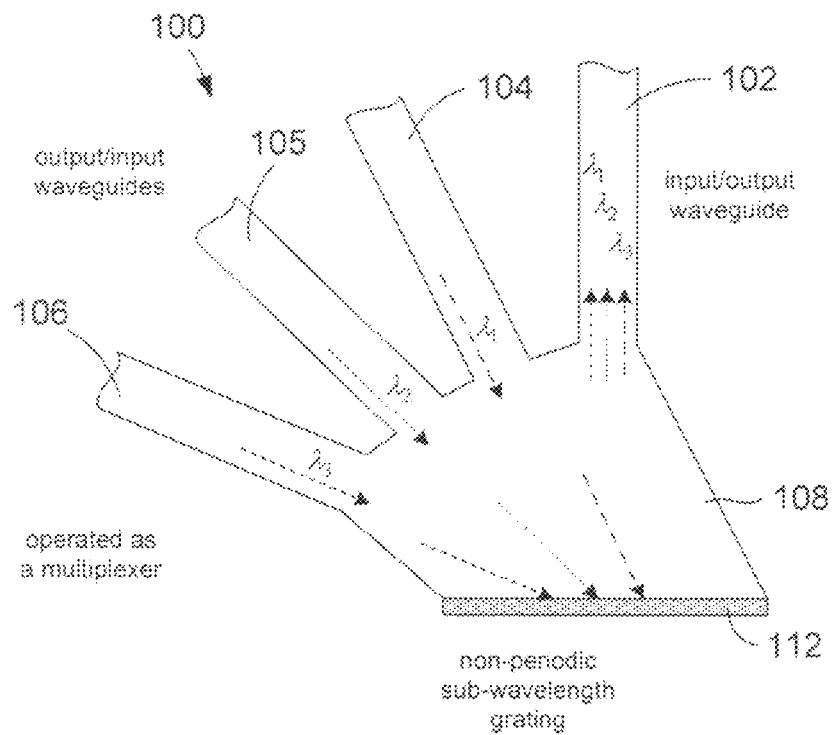
FIGS. 2A-2B show the first system operated as a multiplexer and a demultiplexer in accordance with one or more embodiments of the present invention.

FIG. 2A shows the system 100 operated as a multiplexer in accordance with one or more embodiments of the present invention. As shown in FIG. 2A, output/input waveguides 104-106 separately transmit a different wavelength of light, $\lambda_1$, $\lambda_2$, and $\lambda_3$, respectively, into the region 108. The SWG 112 is configured and oriented with respect to the waveguides 104-106 so that each wavelength output from a corresponding waveguide strikes the SWG 112 and is reflected toward the input/output waveguide 102. For example, as shown in FIG. 2A, the waveguide 104 is oriented so that the wavelength $\lambda_1$ is reflected off of the SWG 112 toward the input/output waveguide 102; the waveguide 105 is oriented so that the wavelength $\lambda_2$ is reflected off of the SWG 112 toward the input/output waveguide 102; and the waveguide 106 is oriented so that the wavelength $\lambda_3$ is reflected off of the SWG 112 toward the input/output waveguide 102.

Figure 2B:
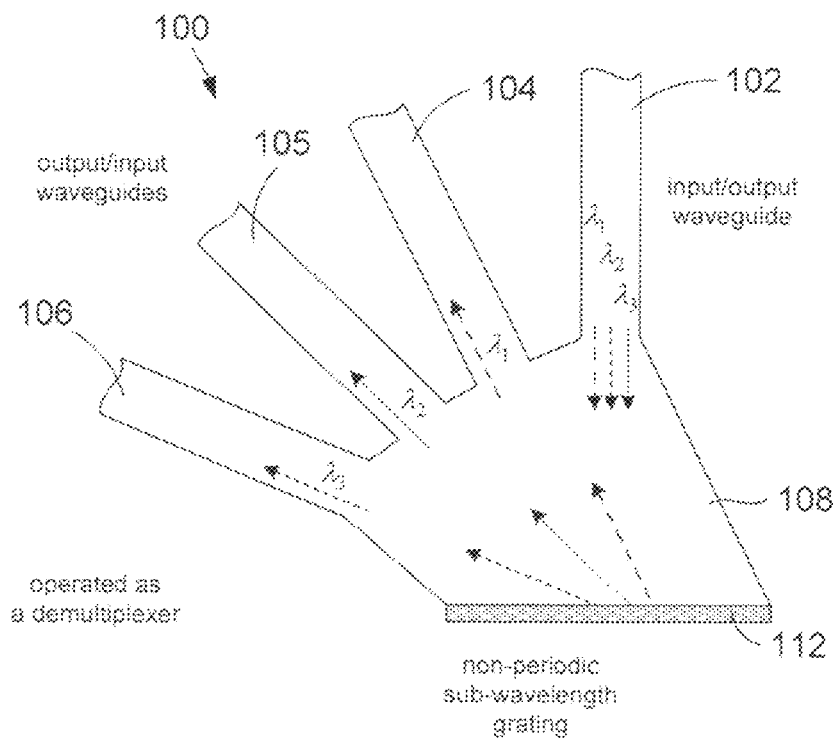

FIG. 2B shows the system 100 operated as a demultiplexer in accordance with one or more embodiments of the present invention. As shown in FIG. 2B, the input/output waveguide 102 transmits all three wavelengths of light into the region 108. The SWG 112 is configured and oriented so that each wavelength output from the input/output waveguide 102 strikes the SWG 112 and is reflected in a different direction toward one of the input/output waveguides 104-106. For example, as shown in FIG. 2A, the waveguide 104 is oriented so that the wavelength $\lambda_1$ is reflected off of the SWG 112 toward the waveguide 104; the waveguide 105 is oriented so that the wavelength $\lambda_2$ is reflected off of the SWG 112 toward the waveguide 105; and the waveguide 106 is oriented so that the wavelength $\lambda_3$ is reflected off of the SWG 112 toward the input/output waveguide 106.

Note that in the example system 100, the input/output waveguide 102 is oriented substantially perpendicular to the planar surface of the SWG 102. In other embodiments, the input/output waveguide 102 can be oriented with any suitable angle to facilitate coupling of wavelengths between the output/input waveguides 104-106 and the input/output waveguide 102.

The system 100 can be composed of a semiconductor or a dielectric material and be disposed on a surface of a lower refractive index substrate that serves as a first cladding layer and air can serve a second cladding layer for exposed portions of the system 100. For example, the system 100 can be composed of, but is not limited to, a group IV semiconductor, such as silicon ("Si") or germanium ("Ge"); a group III-V semiconductor, such as gallium arsenide ("GaAs") or indium phosphide ("InP"); a group II-VI semiconductor, such as zinc selenide ("ZnSe"), or any other suitable elemental or compound semiconductor. The system 100 can be composed of a dielectric material such as silicon oxide ("SiO$_2$") or aluminum oxide ("Al$_2$O$_3$") The waveguides 102, 104-106 and region 108 can be formed using any combination of well-know methods for forming ridge waveguides, including lithography, nanoimprint lithography, or reactive ion etching.

Figure 3:
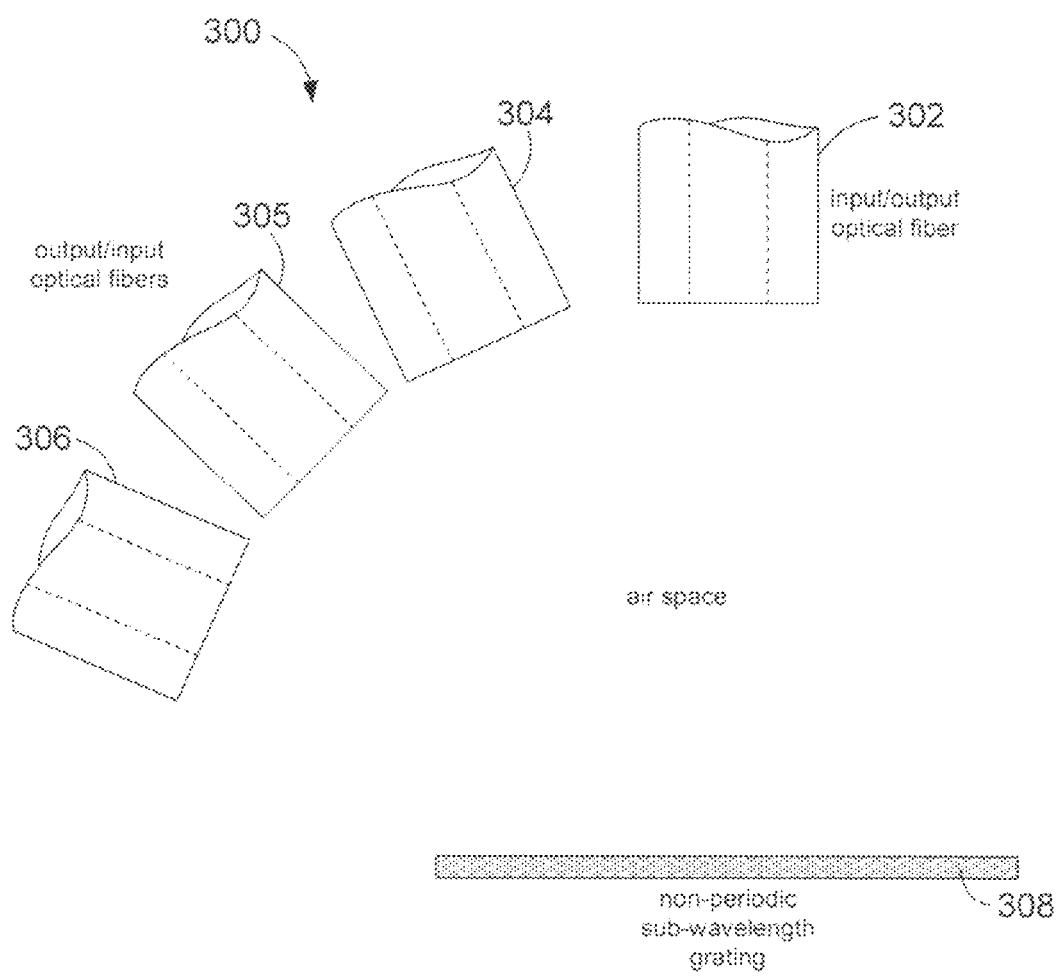
FIG. 3 shows an example of a second multiplexer/demultiplexer system configured in accordance with one or more embodiments of the present invention.

Multiplexer/demultiplexer systems can also be implemented using optical fibers. FIG. 3 shows an example of a second multiplexer/demultiplexer system 300 configured in accordance with one or more embodiments of the present invention. The system 300 includes an input/output optical fiber 302 and three output/input optical fibers 304-306. System 300 also includes a SWG 308. As shown in the example of FIG. 3, air space separates the termini of the fibers 302 and 304-306 and the SWG 308, and the SWG 308 is oriented to face the termini of the fibers 302 and 304-306.

Figure 4A:
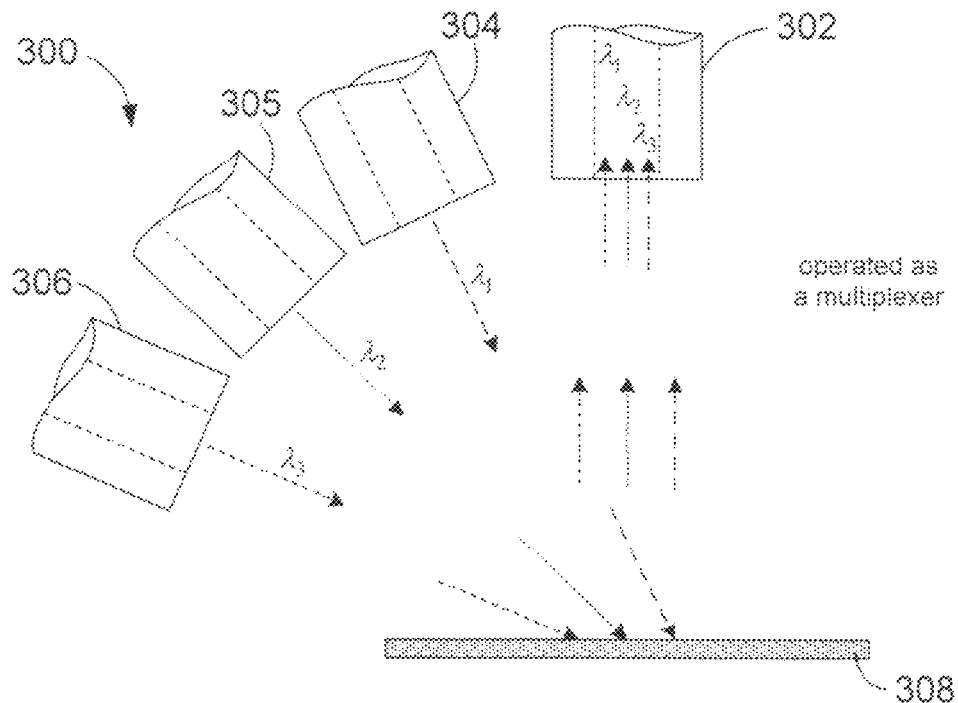
FIGS. 4A-4B show the second system operated as a multiplexer and a demultiplexer in accordance with one or more embodiments of the present invention.

FIG. 4A shows the system 300 operated as a multiplexer in accordance with one or more embodiments of the present invention. As shown in FIG. 4A, output/input optical fibers 304-306 separately transmit a different wavelength of light denoted by $\lambda_1$, $\lambda_2$, and $\lambda_3$, respectively. The SWG 308 is configured and oriented with respect to the termini of the optical fibers 304-306 so that each wavelength output from a corresponding optical fiber strikes the SWG 308 and is reflected toward the input/output optical fiber 302. For example, the fiber 304 is oriented so that the wavelength $\lambda_1$ is reflected off of the SWG 308 toward the fiber 302; the fiber 305 is oriented so that the wavelength $\lambda_2$ is reflected off of the SWG 308 toward the fiber 302; and the fiber 106 is oriented so that the wavelength $\lambda_3$ is reflected off of the SWG 308 and into the fiber 302.

Figure 4B:
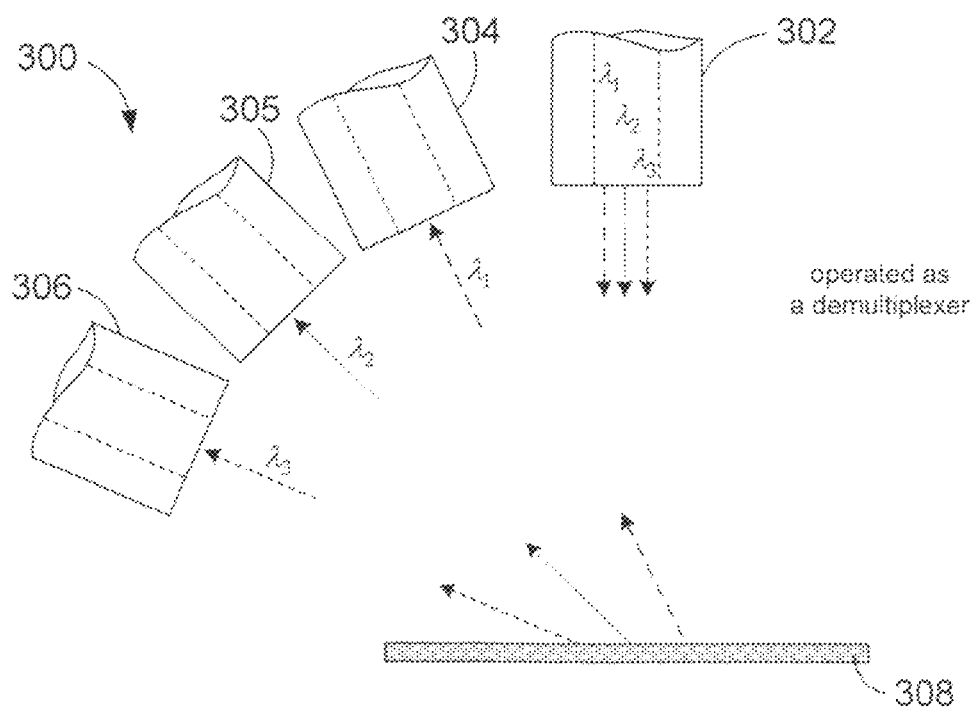

FIG. 4B shows the system 300 operated as a demultiplexer in accordance with one or more embodiments of the present invention. As shown in FIG. 4B, all three wavelengths of light carried by the input/output optical fiber 102 are output toward the SWG 308. The SWG 308 is configured and oriented with respect to the termini of the optical fibers 304-306 so that each wavelength output from the input/output optical fiber 302 strikes the SWG 308 and is reflected toward one of the input/output reflected off of the SWG 308 toward the terminus of the fiber 304; the fiber 305 is oriented so that the wavelength $\lambda_2$ is reflected off of the SWG 112 toward the terminus of the fiber 305; and the fiber 306 is oriented so that the wavelength $\lambda_3$ is reflected off of the SWG 308 toward the terminus of the fiber 306.

Figure 5:
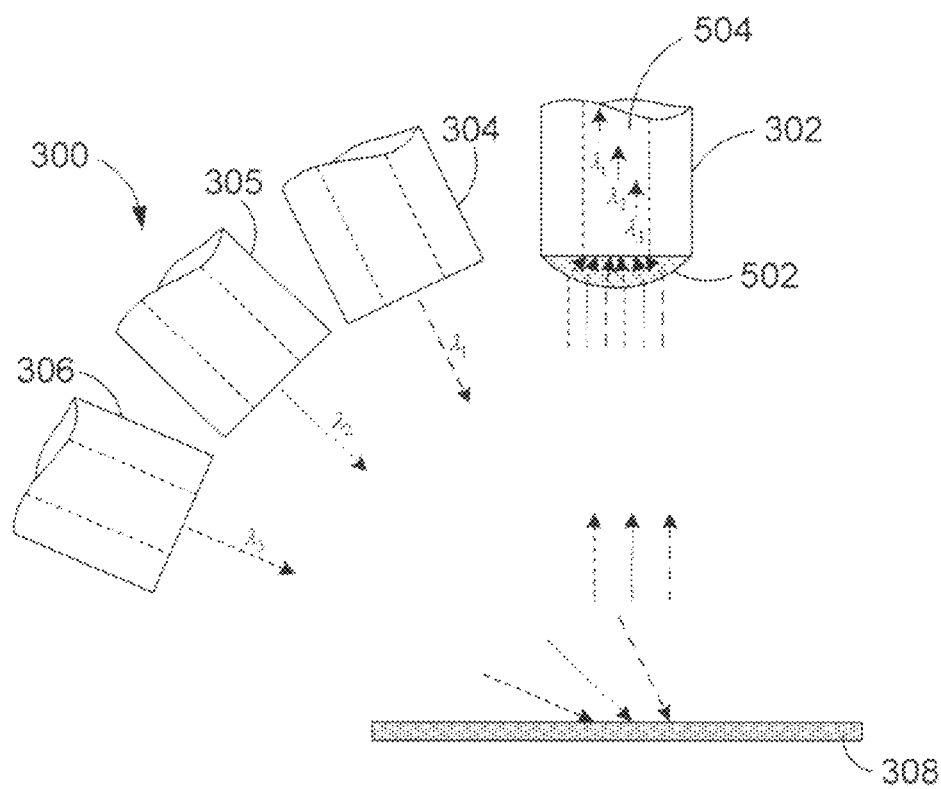
FIG. 5 shows the second system modified to operate as a multiplexer in accordance with one or more embodiments of the present invention.
Figure 6:
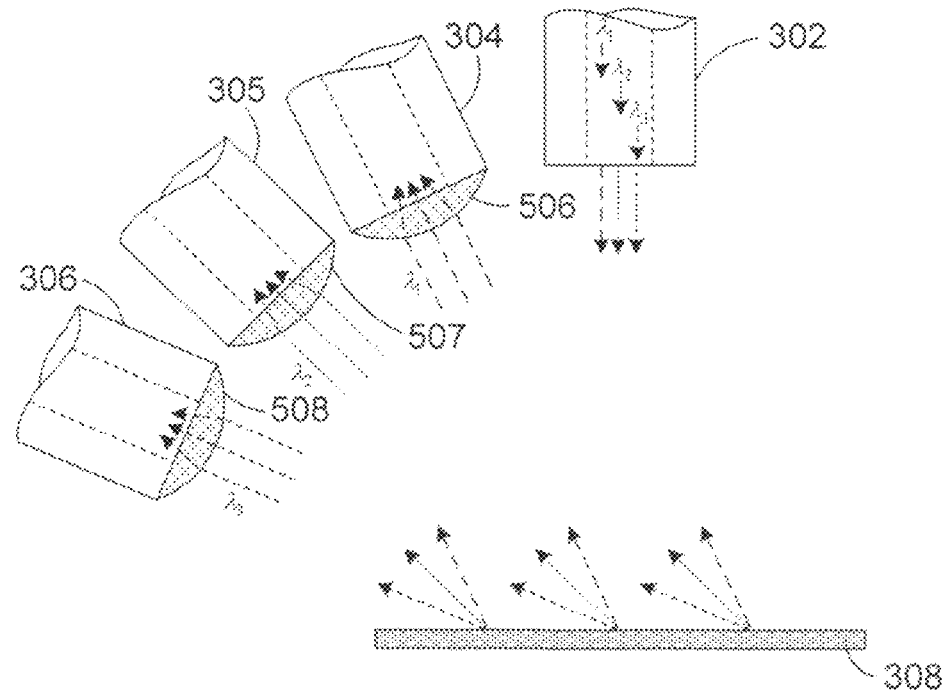
FIG. 6 shows the second system modified to operate as a demultiplexer in accordance with one or more embodiments of the present invention.

Much of the light reflected into air space from the SWG 308 may not be coupled directly into the core of the optical fiber intended to receive the light. In order to increase the efficiency with which light is coupled into the core of an optical fiber, a converging lens can be disposed on the terminus of the optical fiber. FIG. 5 shows the system 300 modified to operate as a multiplexer in accordance with one or more embodiments of the present invention. In FIG. 5, a converging lens 502 is disposed on the terminus of the optical fiber 302 and is configured to capture light reflected from the SWG 308 and direct the light into the core 504 of the optical fiber 302. FIG. 6 shows the system 300 modified to operate as a demultiplexer in accordance with one or more embodiments of the present invention. In FIG. 6, converging lenses 506-508 are disposed on the termini of the optical fibers 304-306, respectively. Each lens is configured to capture light reflected from the SWG 308 and intended for the associated optical fiber and direct the light into the respective core of the optical fiber.

For the sake of simplicity, system embodiments having three output/input waveguides are used to describe various embodiments of the present invention. However, embodiments of the present invention are not intended to be so limited. System embodiments can be configured with two or more output/input waveguides and SWGs can be configured to reflect two or more wavelengths of light incident from one direction toward each of the two or more output/input waveguides.

Planar Non-Periodic Sub-Wavelength Gratings

Figure 7A:
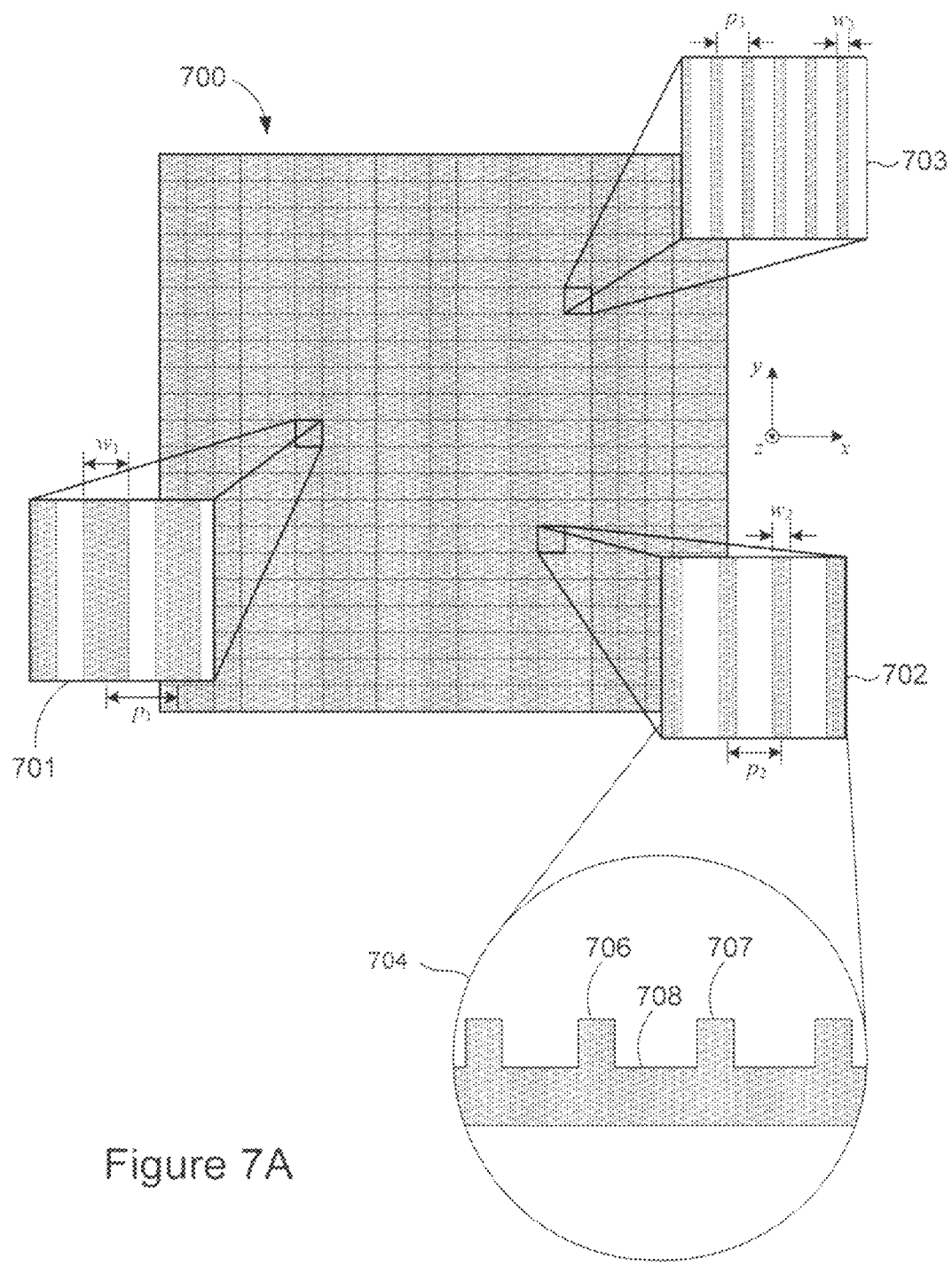
FIG. 7A shows a top plan view of a sub-wavelength grating configured with a one-dimensional grating pattern in accordance with one or more embodiments of the present invention.

FIG. 7A shows a top plan view of a planar SWG 700 configured with a one-dimensional grating pattern in accordance with one or more embodiments of the present invention. The one-dimensional grating pattern is composed of a number of one-dimensional grating sub-patterns. In the example of FIG. 7A, three exemplary grating sub-patterns 701-703 are enlarged. Each grating sub-pattern comprises a number of regularly spaced wire-like portions of material called "lines" separated by grooves. The lines extend in the y-direction and are periodically spaced in the x-direction. FIG. 7A also includes an enlarged end-on view 704 of the grating sub-pattern 702. The end-on view 704 reveals the lines 706 and 707 are separated by a groove 708 extending in the z-direction. Each sub-pattern is characterized by a particular periodic spacing of the lines and by the line width in the x-direction. For example, the sub-pattern 701 comprises lines of width $w_1$ separated by a period $p_1$, the sub-pattern 702 comprises lines with width $w_2$ separated by a period $p_2$, and the sub-pattern 703 comprises lines with width $w_3$ separated by a period $p_3$.

The grating sub-patterns 701-703 form sub-wavelength gratings that can be configured to preferentially reflect incident light, provided the periods $p_1$, $p_2$, and $p_3$ are smaller than the wavelength of the incident light. For example, the lines widths can range from approximately 10 nm to approximately 300 nm and the periods can range from approximately 20 nm to approximately 1 μm depending on the wavelength of the incident light. The phase acquired by reflected light is determined by the line thickness t, and the duty cycle η defined as:

$$\eta = \frac{w}{p}$$

where w is the line width and p is the period of the lines associated with a sub-pattern.

Note the SWG 700 can be configured to reflect the x-polarized component or the y-polarized component of the incident light by adjusting the period, line width and line thickness of the lines. For example, a particular period, line width and line thickness may be suitable for reflecting the x-polarized component but not for reflecting the y-polarized component. On the other hand, a different period, line width and line thickness may be suitable for reflecting the y-polarized component but not for reflecting the x-polarized component.

Figure 7B:
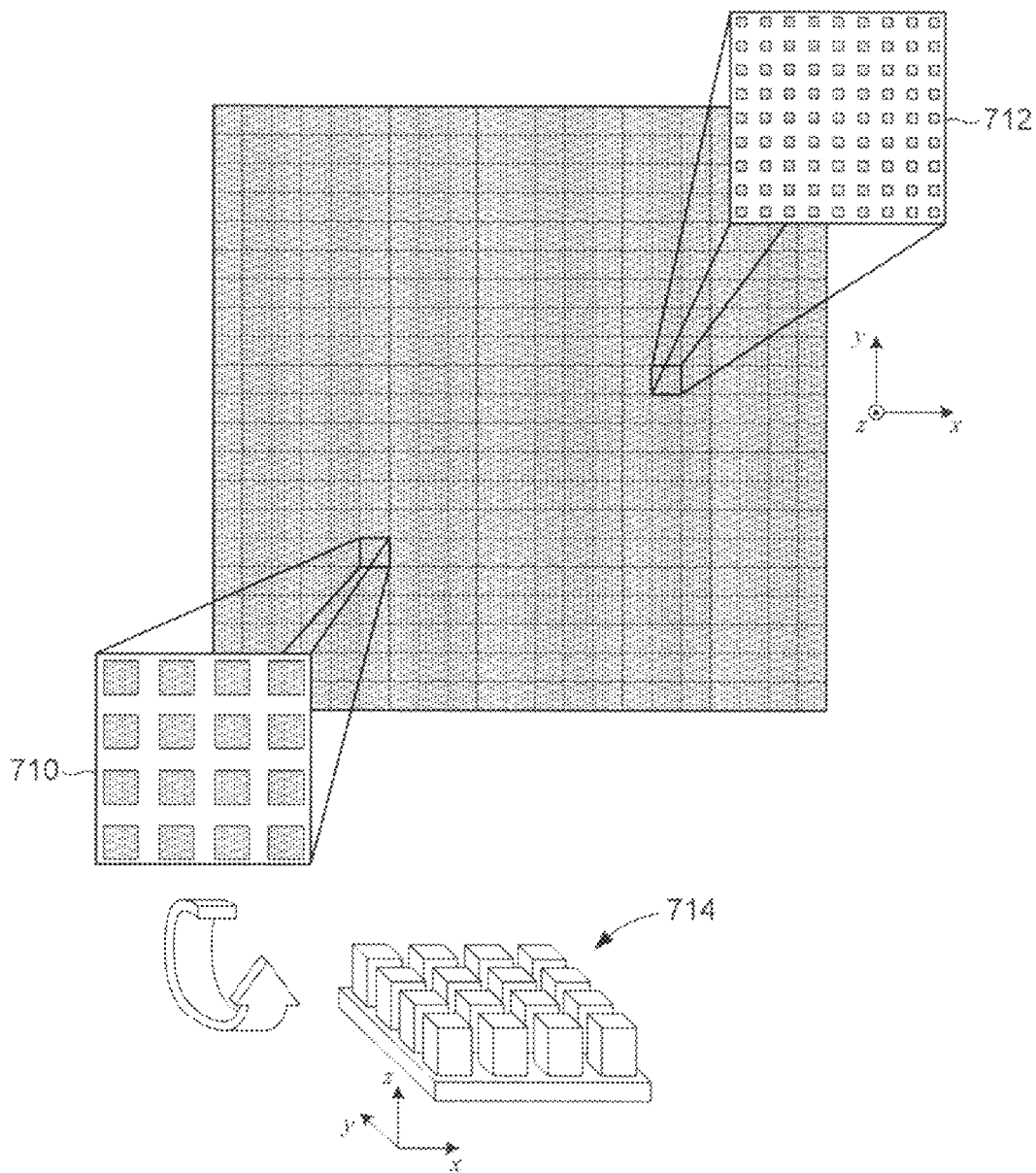
FIGS. 7B-7C show top plan views of two sub-wavelength gratings configured with two-dimensional grating patterns in accordance with one or more embodiments of the present invention.
Figure 7C:
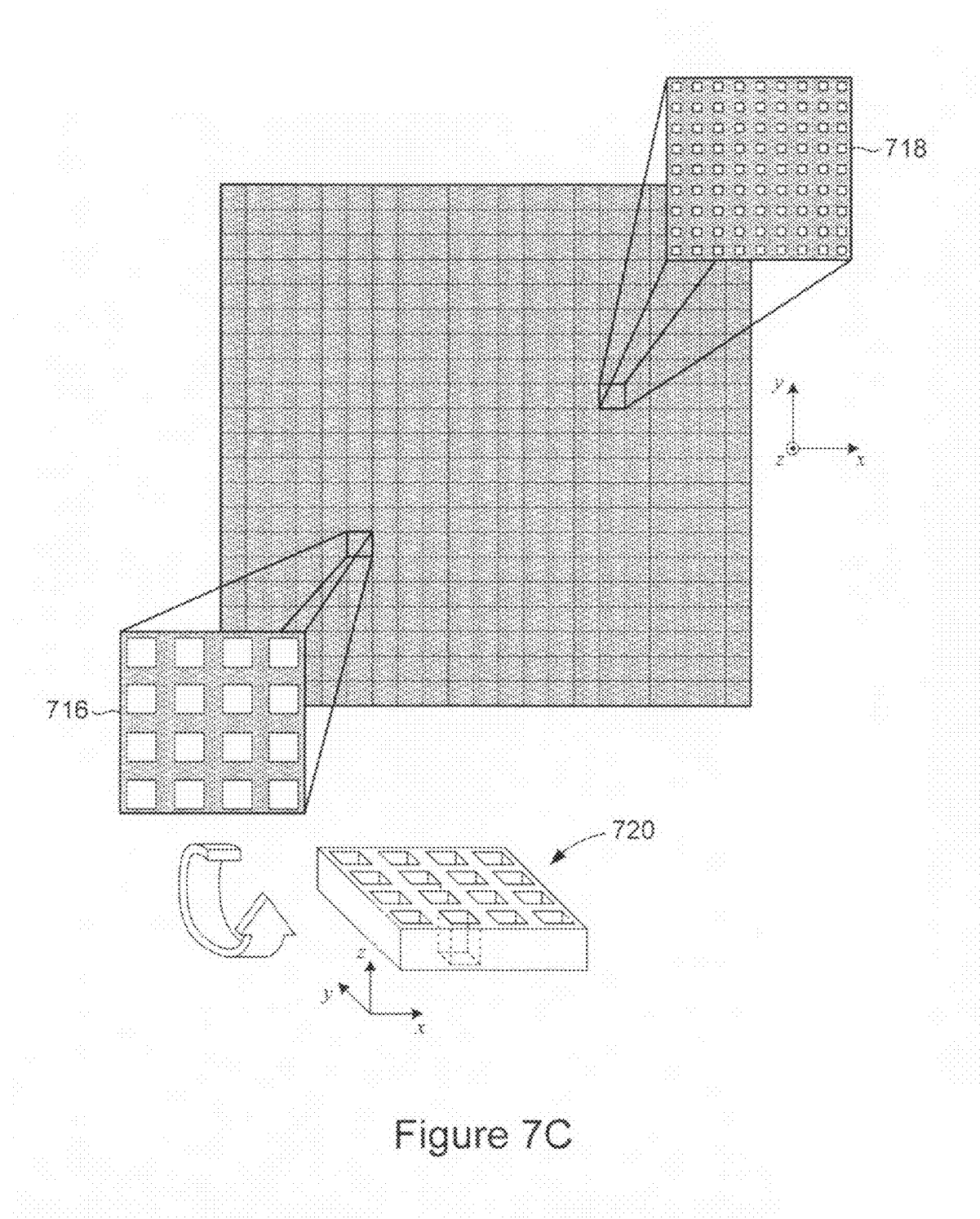

Embodiments of the present invention are not limited to one-dimensional gratings. A SWG can be configured with a two-dimensional, non-periodic grating pattern to reflect polarity insensitive light. FIGS. 7B-7C show top plan views of two example planar SWGs with two-dimensional grating patterns in accordance with one or more embodiments of the present invention. In the example of FIG. 7B, the SWG is composed of posts rather lines separated by grooves. The duty cycle and period can be varied in the x- and y-directions. Enlargements 710 and 712 show two different post sizes. FIG. 7B includes an isometric view 714 of posts comprising the enlargement 710. Embodiments of the present invention are not limited to square-shaped posts, in other embodiments that posts can be rectangular shaped, circular shaped, or elliptical shaped. In the example of FIG. 7C, the SWG is composed of holes rather posts. Enlargements 716 and 718 show two different hole sizes. FIG. 7C includes an isometric view 720 comprising the enlargement 716. Although the holes shown in FIG. 7C are square shaped, in other embodiments, the holes can be rectangular, circular, or any other suitable shape.

In other embodiments, the line spacing, thickness, and periods can be continuously varying in both one- and two-dimensional grating patterns.

Figure 8:
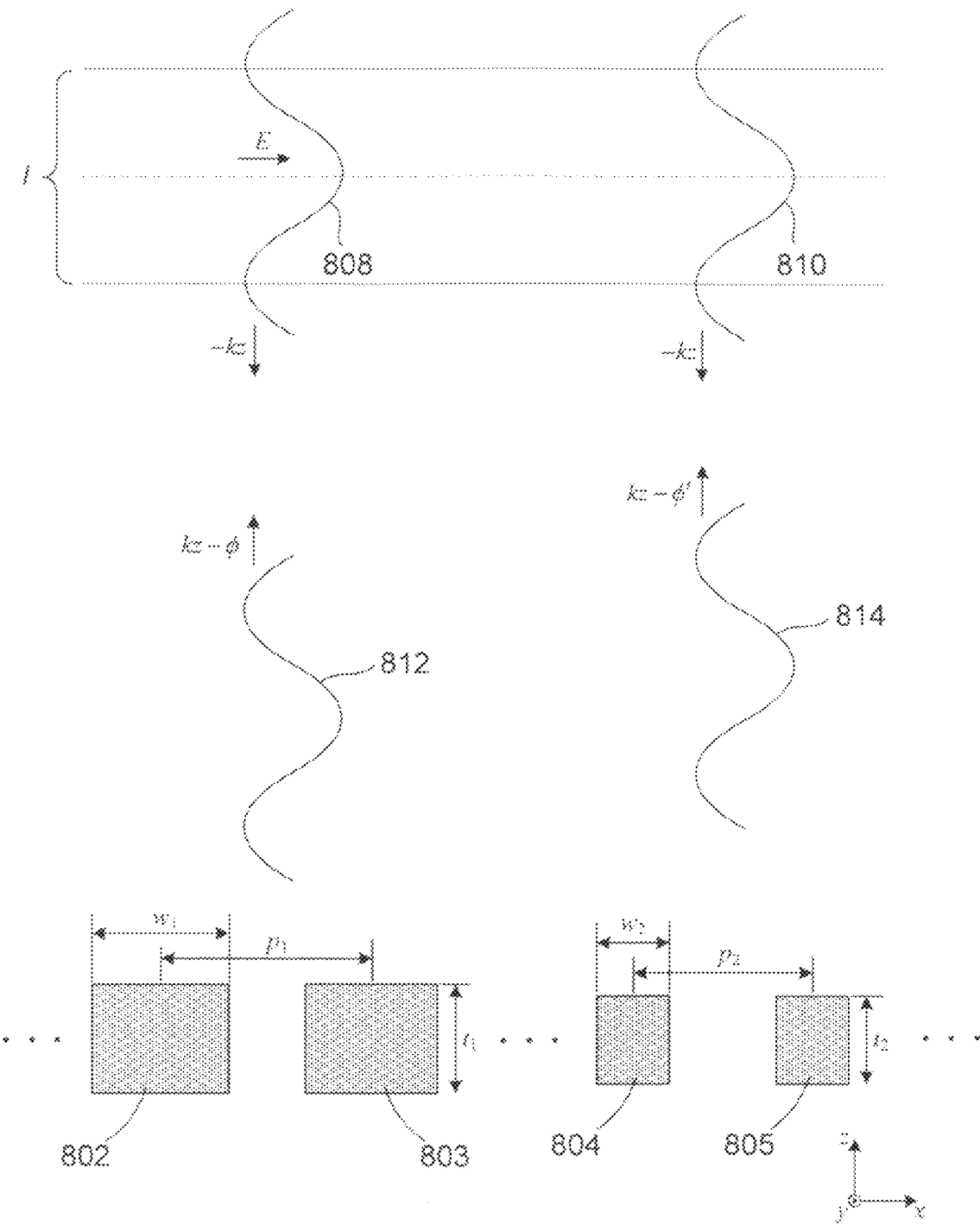
FIG. 8 shows a cross-sectional view of lines from two separate grating sub-patterns revealing the phase acquired by reflected light in accordance with one or more embodiments of the present invention.

The grating sub-patterns described above can be configured to reflect incident light differently due to the different thicknesses, duty cycles, and periods selected for each of the sub-patterns. Each of the grating sub-patterns 701-703 also reflect incident light polarized in one direction, say the x-direction, differently due to the different duty cycles and periods associated with each of the sub-patterns. FIG. 8 shows a cross-sectional view of lines from two separate grating sub-patterns revealing the phase acquired by reflected light in accordance with one or more embodiments of the present invention. For example, lines 802 and 803 can be lines in a first sub-pattern and lines 804 and 805 can be lines in a second sub-pattern located elsewhere on the substrate SWG. The thickness $t_1$ of the lines 802 and 803 is greater than the thickness $t_2$ of the lines 804 and 805, and the duty cycle $\eta_1$ associated with the lines 802 and 803 is also greater than the duty cycle $\eta_2$ associated with the lines 804 and 805. Light polarized in the x-direction and incident on the lines 802-805 becomes trapped by the lines 802 and 803 for a relatively longer period of time than the portion of the incident light trapped by the lines 804 and 805. As a result, the portion of light reflected into the far field from the lines 802 and 803 acquires a larger phase shift than the portion of light reflected into the far field from the lines 804 and 805. As shown in the example of FIG. 8, the incident waves 808 and 810 strike the lines 802-805 with approximately the same phase, but the wave 812 reflected from the lines 802 and 803 acquires a relatively larger phase shift $\phi$ than the phase $\phi'$ ($\phi > \phi'$) acquired by the wave 814 reflected from the lines 804 and 805.

Figure 9:
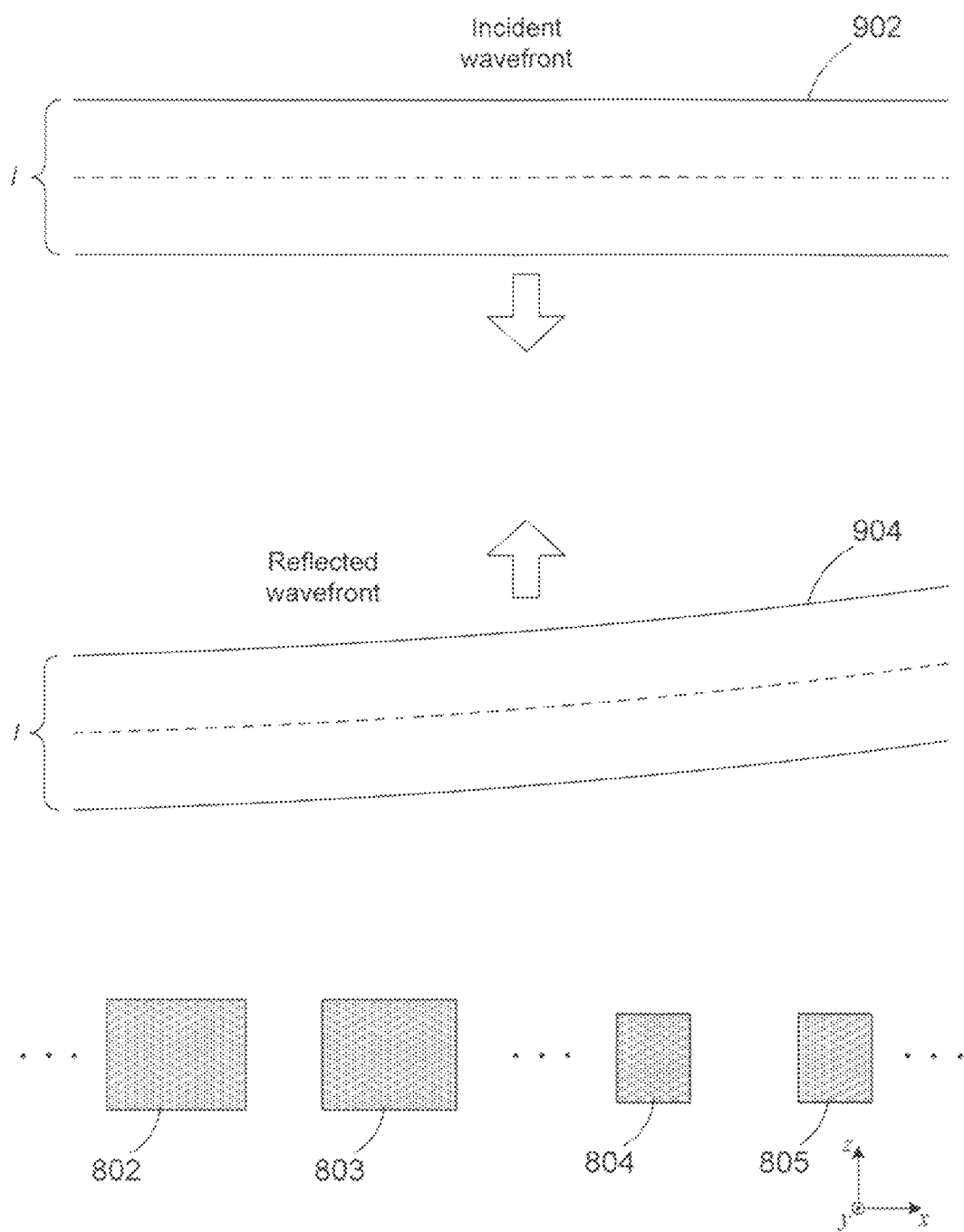
FIG. 9 shows a cross-sectional view of lines from two separate grating sub-patterns revealing how the wavefront changes in accordance with one or more embodiments of the present invention.

FIG. 9 shows a cross-sectional view of the lines 802-805 revealing how the wavefront changes in accordance with one or more embodiments of the present invention. As shown in the example of FIG. 9, incident light with a substantially uniform wavefront 902 strikes the lines 802-805 producing reflected light with a curved reflected wavefront 904. The curved reflected wavefront 904 results from portions of the incident wavefront 902 interacting with the lines 802 and 803 with a relatively larger duty cycle $\eta_1$ and thickness $t_1$ than portions of the same incident wavefront 902 interacting with the lines 804 and 805 with a relatively smaller duty cycle $\eta_2$ and thickness $t_2$. The shape of the reflected wavefront 904 is consistent with the larger phase acquired by light striking the lines 802 and 803 relative to the smaller phase acquired by light striking the lines 804 and 805.

Figure 10:
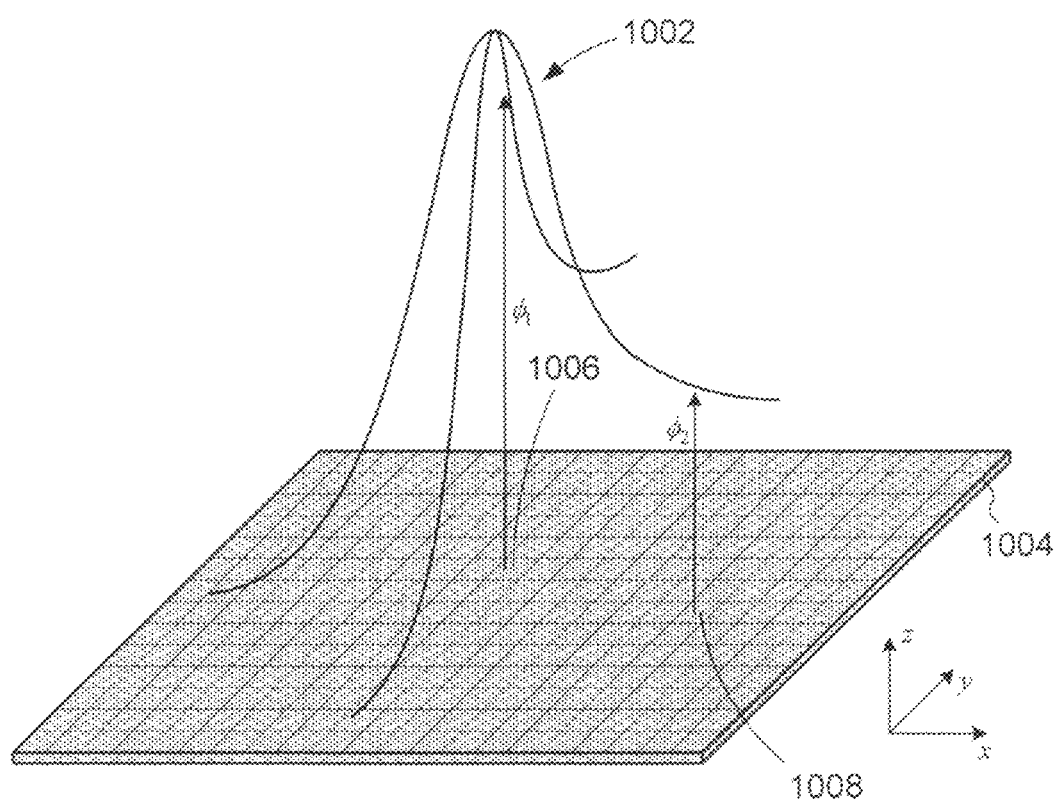
FIG. 10 shows an isometric view of an exemplary phase change contour map produced by a grating pattern configured in accordance with one or more embodiments of the present invention.

The SWGs 200 can be configured to apply a particular phase change to reflected light while maintaining a very high reflectivity. FIG. 10 shows an isometric view of an exemplary phase change contour map 1002 produced by a particular grating pattern of a SWG 1004 in accordance with one or more embodiments of the present invention. The contour map 1002 represents the magnitude of the phase change acquired by light reflected from the SWG 1004. In the example shown in FIG. 10, the grating pattern produces a Gaussian-shaped phase contour map 1002 with the largest magnitude in the phase acquired by the light reflected near the center of the SWG 1004. The magnitude of the phase acquired by reflected light decreases away from the center of the grating layer 1004. For example, light reflected from a sub-pattern 1006 acquires a phase of $\phi_1$, and light reflected from a sub-pattern 1008 acquires a phase of $\phi_2$. Because $\phi_1$ is much larger than $\phi_2$, the light reflected from the sub-pattern 1006 acquires a much larger phase than the light reflected from the sub-pattern 1008.

The phase change in turn shapes the wavefront of light reflected from the SWG. For example, as described above with reference to FIG. 9, lines having a relatively larger duty cycle produce a larger phase shift in reflected light than lines having a relatively smaller duty cycle. As a result, a first portion of a wavefront reflected from lines having a first duty cycle lags behind a second portion of the same wavefront reflected from a different set of lines configured with a second relatively smaller duty cycle. Embodiments of the present invention include patterning the grating layer of a SWG to control the phase change and ultimately the reflected wavefront so that the SWG can be operated as an optical device with particular optical properties.

Operation of the SWG described with reference to FIGS. 7-10 is for one wavelength of incident light. However, different wavelengths of light incident on the same SWG experience different phase shifts. FIGS. 11A-11C show side views of a SWG 1100 configured to reflect light with a linearly varying wavefront in accordance with one or more embodiments of the present invention. As shown in the examples of FIGS. 11A-11C, the reflection angle, $\theta$, is different for different wavelengths of light $\lambda_1, \lambda_2$, and $\lambda_3$ incident on the SWG 1100. In FIG. 11A, the SWG 1100 reflects light with the wavelength $\lambda_1$ and direction $\theta_1$. In FIG. 11B, the SWG 1100 reflects light with the wavelength $\lambda_2$ and direction $\theta_2$. In FIG. 11C, the SWG 1100 reflects light with the wavelength $\lambda_3$ and direction $\theta_3$.

Referring now to the systems 100 and 300 described above with reference to FIGS. 1-6, the SWGs 112 and 308 can be configured as described with reference to FIG. 11 to produce linearly varying wavefronts, where each wavefront is directed to a different waveguide or optical fiber. For example, the wavefront produced with reference to FIG. 11A is reflected with an angle of reflectance $\theta_1$ toward the waveguide 104 or the optical fiber 304; the wavefront produced with reference to FIG. 11B is reflected with an angle of reflectance $\theta_2$ toward the waveguide 105 or the optical fiber 305; and the wavefront produced with reference to FIG. 11C is reflected with an angle of reflectance $\theta_3$ toward the waveguide 106 or the optical fiber 306.

Figure 12A:
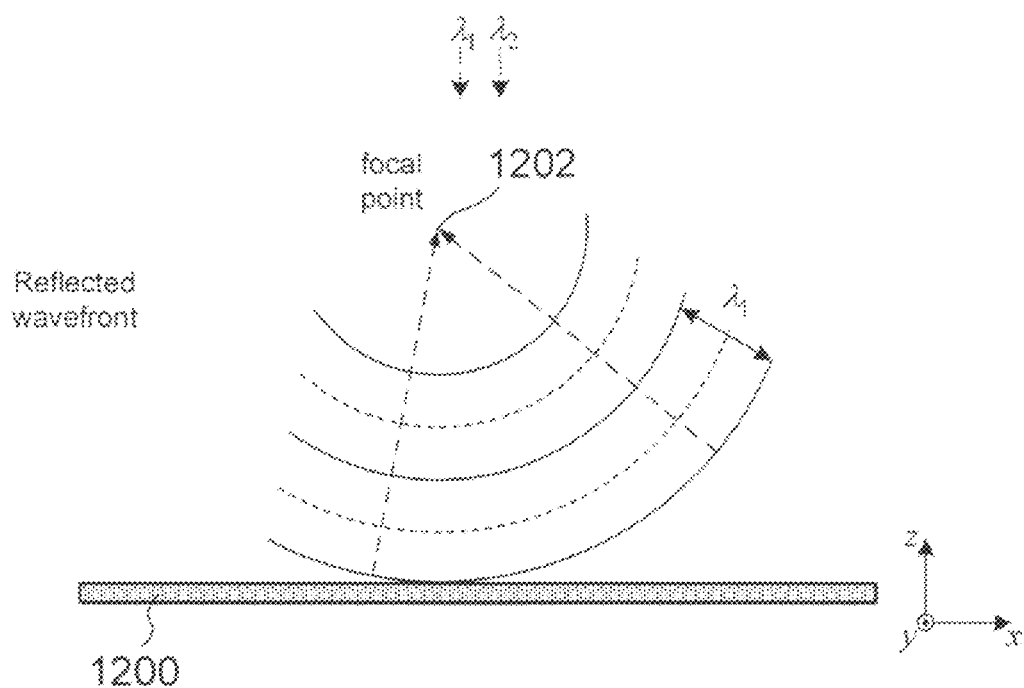
FIGS. 12A-12B show side views of a non-periodic, sub-wavelength grating configured to reflect light with a non-linearly varying wavefront in accordance with one or more embodiments of the present invention.
Figure 12B:
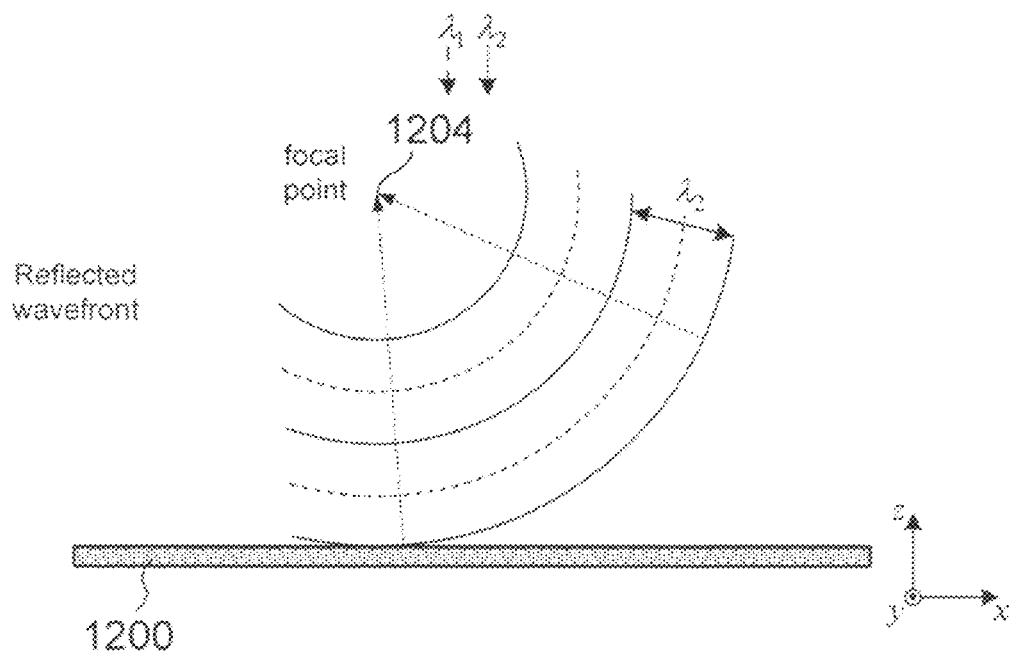

In other embodiments, the SWG can also be configured to focus light onto a particular focal point, and because different wavelengths incident on the same SWG experience different phase shifts, the focal point associated with each wavelength is different. FIGS. 12A-12B show side views of a SWG 1200 configured to reflect light with a non-linearly varying wavefront in accordance with one or more embodiments of the present invention. In particular, the SWG 1200 is configured to focus reflected light onto a focal point. In FIG. 12A, the SWG 1200 produces a wavefront associated with the wavelength $\lambda_1$ where the reflected light is focused on a first focal point 1202. In FIG. 12B, the SWG 1200 produces a wavefront associated with the wavelength $\lambda_2$ where the reflected light is focused on a second focal point 1204.

Referring now to the systems 100 and 300 described above with reference to FIGS. 1-6, the SWGs 112 and 308 can be configured as described with reference to FIG. 12 to focus a wavelength into a particular waveguide or optical fiber. For example, as shown in FIG. 12A, light with the wavelength $\lambda_1$ is reflected to a focal point that may lie within the waveguide 104 or the optical fiber 304; and, as shown in FIG. 12B, light with the wavelength $\lambda_2$ is reflected to a focal point that may lie with the waveguide 105 or the optical fiber 305.

Designing and Fabricating Sub-Wavelength Gratings

Figure 13:
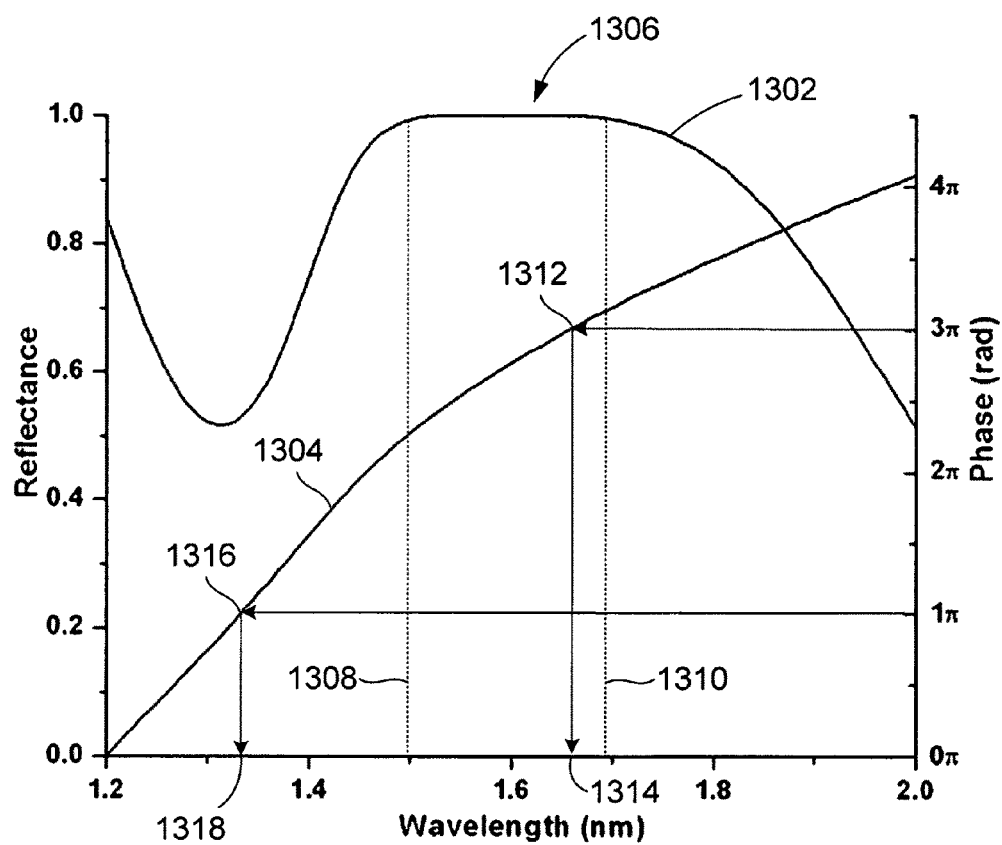
FIG. 13 shows a plot of reflectance and phase shift over a range of incident light wavelengths for a sub-wavelength grating configured in accordance with one or more embodiments of the present invention.

Embodiments of the present invention include a number of ways in which a SWG can be designed to introduce a desired phase front to the reflected light. A first method includes determining a reflection coefficient profile for a SWG. The reflection coefficient is a complex valued function represented by:

$$r(\lambda) = \sqrt{R(\lambda)} e^{i\phi(\lambda)}$$

where $R(\lambda)$ is the reflectance of the SWG, and $\phi(\lambda)$ is the phase shift or change produced by the SWG. FIG. 13 shows a plot of reflectance and phase shift over a range of incident light wavelengths for a SWG comprising a Si grating layer disposed on a quartz substrate in accordance with one or more embodiments of the present invention. In this example, the grating layer is configured with a one-dimensional grating and is operated at normal incidence with the electric field polarized perpendicular to the lines comprising the grating layer. In FIG. 13, curve 1302 corresponds to the reflectance $R(\lambda)$ and curve 1304 corresponds to the phase shift $\phi(\lambda)$ produced by the SWG for the incident light over the wavelength range of approximately 1.2 μm to approximately 2.0 μm. The reflectance and phase curves 1302 and 1304 can be determined using either the well-known finite element method or rigorous coupled wave analysis. Due to the strong refractive index contrast between Si and air, the grating has a broad spectral region of high reflectivity 1306. However, curve 1304 reveals that the phase of the reflected light varies across the entire high-reflectivity spectral region between dashed-lines 1308 and 1310.

When the spatial dimensions of the period and width of the lines is changed uniformly by a factor $\alpha$, the reflection coefficient profile remains substantially unchanged, but with the wavelength axis scaled by the factor $\alpha$. In other words, when a grating has been designed with a particular reflection coefficient $R_0$ at a air space wavelength $\lambda_0$, a new grating with the same reflection coefficient at a different wavelength $\lambda$ can be designed by multiplying all the grating geometric parameters, such as the period, line thickness, and line width, by the factor $\alpha = \lambda/\lambda_0$, giving $r(\lambda) = r_0(\lambda/\alpha) = r_0(\lambda_0)$.

In addition, a grating can be designed with $|R(\lambda)| \rightarrow 1$, but with a spatially varying phase, by scaling the parameters of the original periodic grating non-uniformly within the high-reflectivity spectral window 1306. Suppose that introducing a phase $\phi(x,y)$ on light reflected from a point on the SWG with transverse coordinates (x,y) is desired. Near the point (x,y), a nonuniform grating with a slowly varying grating scale factor $\alpha(x,y)$ behaves locally as though the grating was a periodic grating with a reflection coefficient $R_0(\lambda/\alpha)$. Thus, given a periodic grating design with a phase $\phi_0$ at some wavelength $\lambda_0$, choosing a local scale factor $\alpha(x,y) = \lambda/\lambda_0$ gives $\phi(x,y) = \phi_0$ at the operating wavelength $\lambda$. For example, suppose that introducing a phase of approximately $3\pi$ on a portion of the light reflected from a point (x,y) on a SWG design is desired, but the line width and period selected for the point (x,y) introduces a phase of approximately π. Referring now to the plot of FIG. 13, the desired phase $\phi_0=3\pi$ corresponds to the point 1312 on the curve 1304 and the wavelength $\lambda_0 \approx 1.67$ μm 1314, and the phase π associated with the point (x,y) corresponds to the point 1316 on the curve 1304 and the wavelength $\lambda \approx 1.34$ μm 1318. Thus the scale factor is $\alpha(x,y)=\lambda/\lambda_0=1.34/1.67=0.802$, and the line width and period at the point (x,y) can be adjusted by multiplying by the factor α in order to obtain the desired phase $\phi_0=3\pi$ at the operating wavelength $\lambda=1.34$ μm.

Figure 14:
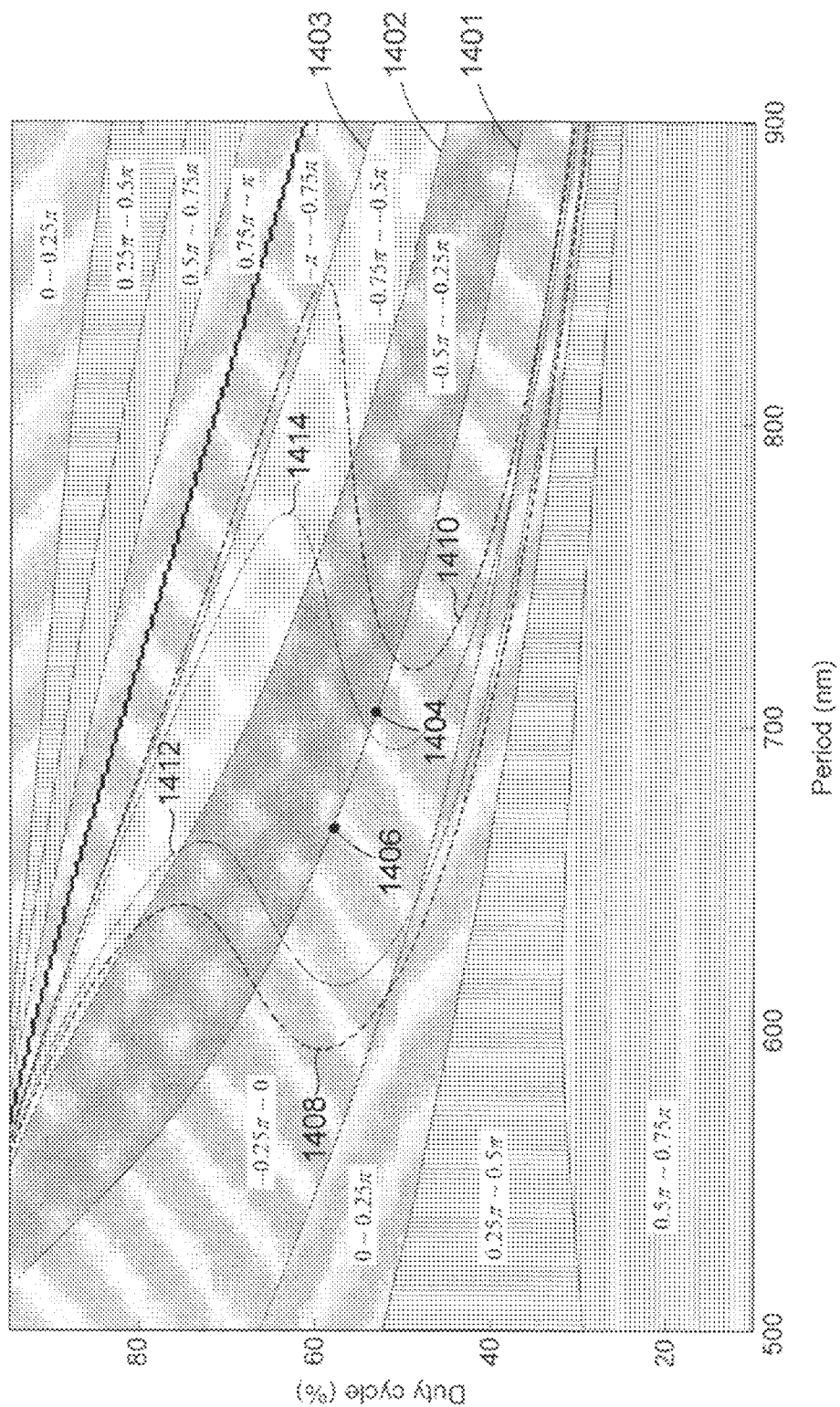
FIG. 14 shows a phase contour plot of phase variation as a function of period and duty cycle obtained in accordance with one or more embodiments of the present invention.

The plot of reflectance and phase shift versus a range of wavelengths shown in FIG. 13 represents one way in which parameters of a SWG, such as line width, line thickness and period, can be determined in order to introduce a particular phase to light reflected from a particular point of the SWG. In other embodiments, phase variation as a function of period and duty cycle can also be used to construct a SWG. FIG. 14 shows a phase contour plot of phase variation as a function of period and duty cycle obtained in accordance with one or more embodiments of the present invention using either the well-known finite element method or rigorous coupled wave analysis. Contour lines, such as contour lines 1401-1403, each correspond to a particular phase acquired by light reflected from a grating pattern with a period and duty cycle lying anywhere along the contour. The phase contours are separated by 0.25 π rad. For example, contour 1401 corresponds to periods and duty cycles that apply a phase of −0.25π rad to reflected light, and contour 1402 corresponds to periods and duty cycles that apply a phase of −0.5π rad to reflected light. Phases between −0.25 π rad and −0.5π rad are applied to light reflected from a SWG with periods and duty cycles that lie between contours 1401 and 1402. A first point (p,η) 1404, corresponding to a grating period of 700 nm and 54% duty cycle, and a second point (p,η) 1406, corresponding to a grating period of 660 nm and 60% duty cycle, both of which lie along the contour 1401. A grating pattern with a period and duty cycle represented by the first point 1404 introduces the same phase $\phi=-0.257\pi$ rad to reflected light as a grating pattern represented by the second point 1406.

FIG. 14 also includes two reflectivity contours for 95% and 98% reflectivity overlain on the phase contour surface. Dashed-line contours 1408 and 1410 correspond to 95% reflectivity, and solid line contours 1412 and 1414 correspond to 98% reflectivity. Points (p,η,φ) that lie anywhere between the contours 1408 and 1410 have a minimum reflectivity of 95%, and points (p,η,φ) that lie anywhere between the contours 1412 and 1414 have a minimum reflectivity of 98%.

Figure 15A:
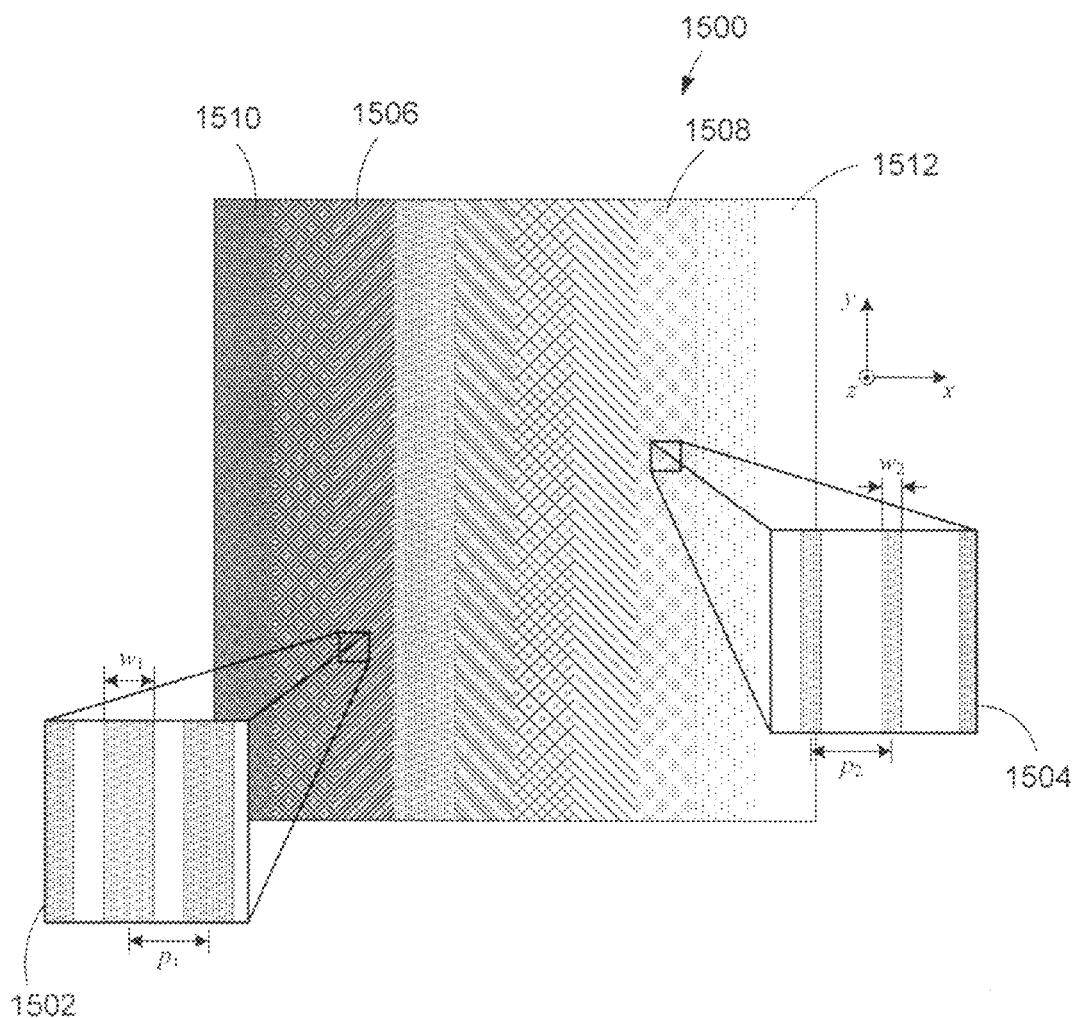
FIGS. 15A-15C show top plan views of a non-periodic, sub-wavelength gratings configured to reflect normal incident light in accordance with one or more embodiments of the present invention.

FIG. 15A shows a top plan view of a one-dimensional SWG 1500 configured to reflect normal incident light polarized in the x-direction in accordance with one or more embodiments of the present invention. The SWG is composed of differently shaded regions, with each region formed from lines extending in the y-direction, but with the duty cycle progressively decreasing in the x-direction. Enlargements 1502 and 1504 show sub-regions of regions 1506 and 1508, respectively. The duty cycles for the regions are selected so that the resulting phase change in the reflected light is largest for the region 1510 and decreases to the region 1512. The change in duty cycle can be linearly varying, resulting in the linearly varying wavefront described above with reference to FIG. 11, or non-linear varying resulting focused light, as described above with reference to FIG. 12.

Figure 15B:
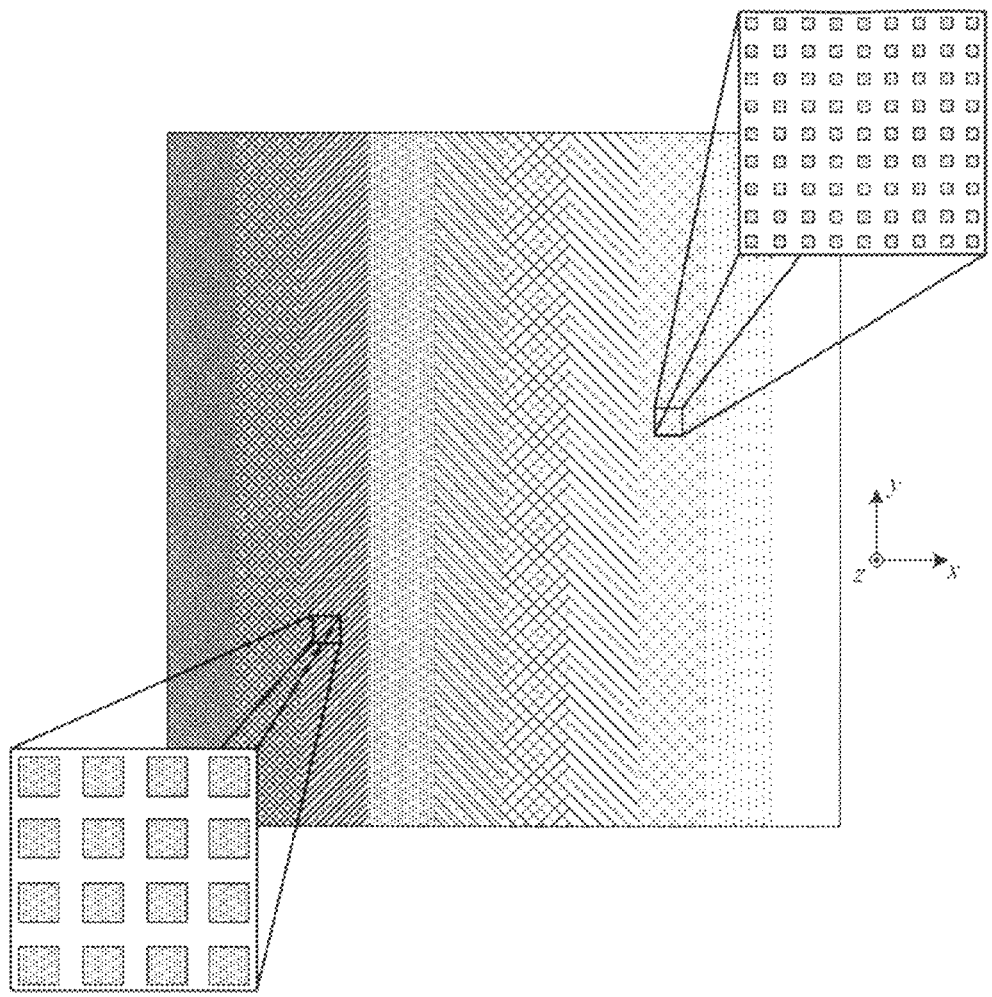
Figure 15C:
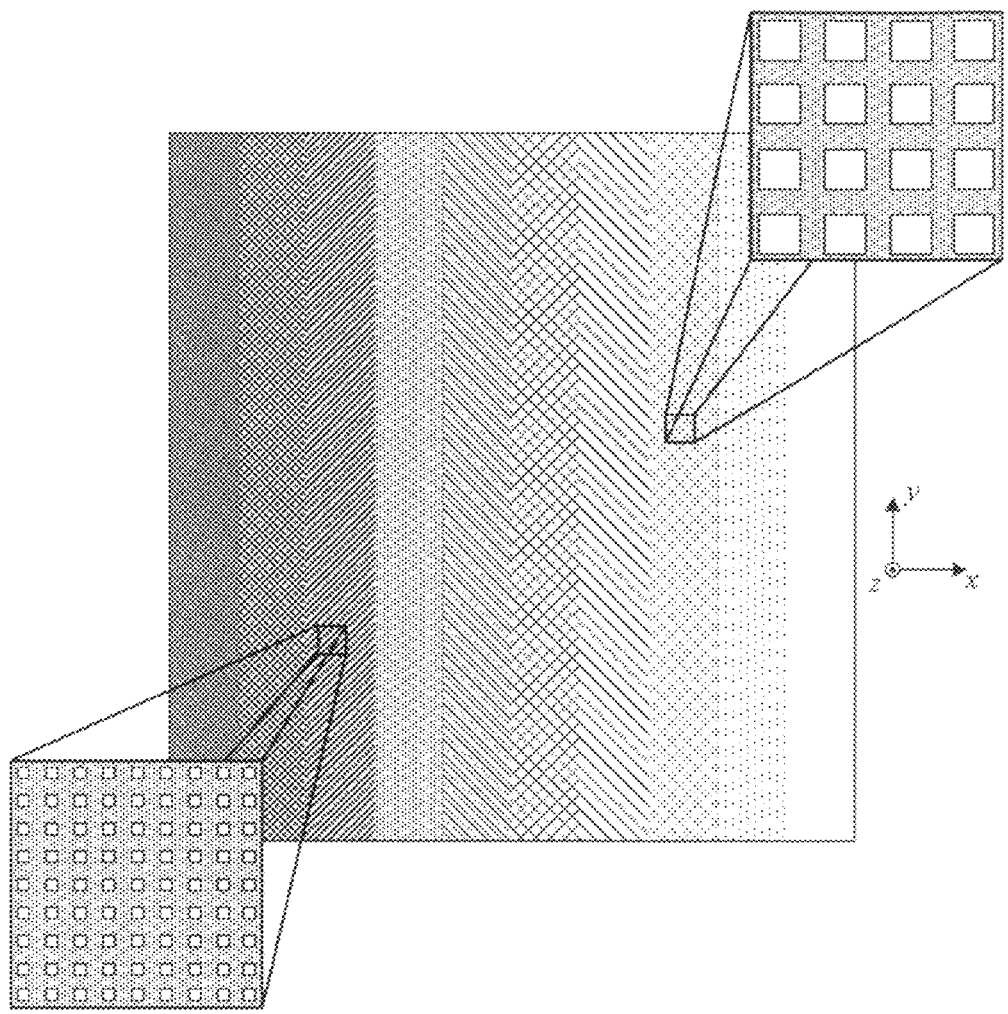

FIGS. 15B-15C show top plan views of a two-dimensional SWGs configured to reflect normal incident light in accordance with one or more embodiments of the present invention. The two-dimensional SWGs, shown in FIGS. 15B-15C, are insensitive to the polarization of the incident light. As shown in FIGS. 15B-15C, the SWGs are configured so that the duty cycle is progressively increasing in the x-direction, and the resulting phase change in the reflected light is largest for darker shaded regions than for lighter shaded regions. The change in duty cycle can be linearly varying, resulting in the linearly varying wavefront, as described above with reference to FIG. 11, or non-linear varying resulting in focused light, as described above with reference to FIG. 12.

In certain embodiment, SWGs can be fabricated in a single layer or membrane composed of a high index material. For example, the SWGs can be composed of, but is not limited to, an elemental semiconductor, such as silicon ("Si") or germanium ("Ge"); a III-V semiconductor, such as gallium arsenide ("GaAs"); a II-VI semiconductor; or a dielectric material, such silicon carbide ("SiC"). In other embodiments, SWGs can be composed of a grating layer disposed on a surface of a substrate, where the grating layer is composed of a relatively higher refractive index material than the substrate. For example, the grating layer can be composed of one of the materials described above and the substrate can be composed of quartz or silicon dioxide ("$SiO_2$"), aluminum gallium arsenide ("AlGaAs"), or aluminum oxide ("$Al_2O_3$").

A SWG can be fabricated in 450 nm thick amorphous Si deposited on a quartz substrate at approximately 300° C. using plasma-enhanced chemical vapor deposition. The grating pattern can be defined using electron beam lithography with a commercial hydrogen silsequioxane negative resist, FOX-12®, exposed at 200 μC/$cm^2$ and developed for 3 minutes in a solution of MIF 300 developer. After development, the grating patterns can be descummed using $CH_4/H_2$ reactive ion etching to clear the resist residue from the grooves between the grating lines. The Si lines can be formed by dry etching with $HBr/O_2$ chemistry. At the end of the process, a 100 nm thick resist layer may remain on top of the Si lines, which was included in the numerical simulation results described below. The grating can also be fabricated using photolithography, nano-imprint lithography, or e-beam lithography with a positive tone resist.

Figure 16A:
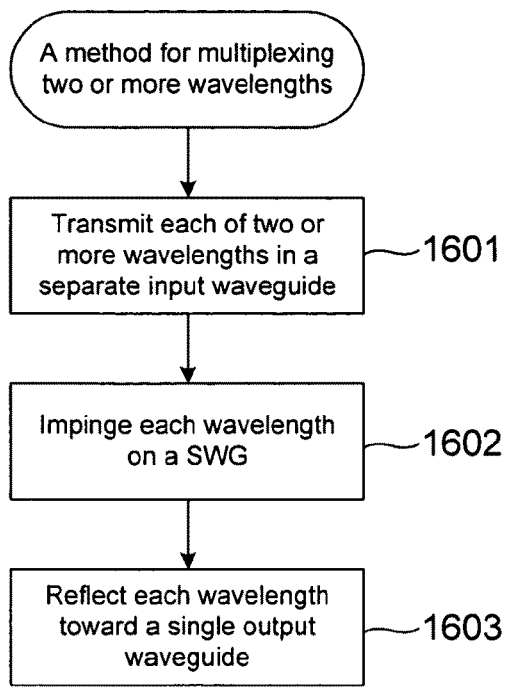
FIGS. 16A-16B show flow diagrams summarizing methods for multiplexing and demultiplexing two or more wavelengths of light in accordance with one or more embodiments of the present invention.

FIG. 16A shows a flow diagram summarizing a method for multiplexing two or more wavelengths of light in accordance with one or more embodiments of the present invention. In step 1601, each of two or more wavelengths is transmitted in a separate waveguide, as described above with reference to FIGS. 2A and 4A. In step 1602, the wavelengths impinge a planar, non-periodic, sub-wavelength grating, as described above with reference to FIGS. 11 and 12. In step 1603, each wavelength of light that strikes the grating is reflected toward a single output waveguide, wherein the output waveguide carries the two or more wavelengths, as described above with reference to FIGS. 2A and 4A.

Figure 16B:
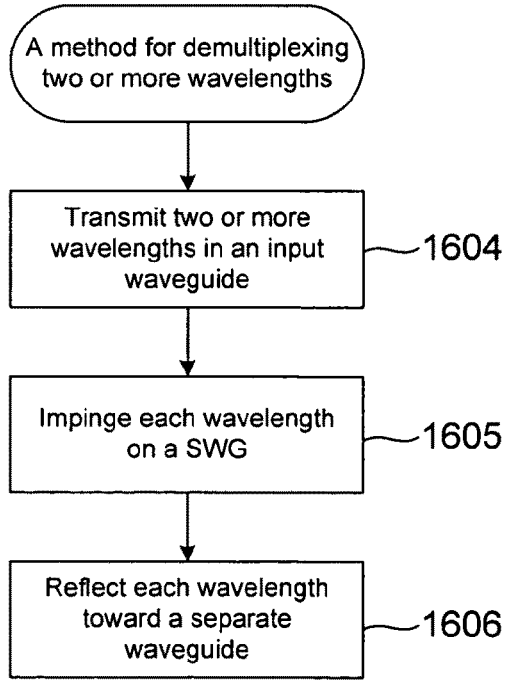

FIG. 16B shows a flow diagram summarizing a method for demultiplexing two or more wavelengths of light in accordance with one or more embodiments of the present invention. In step 1604, two or more wavelengths of light are transmitted in a single input waveguide, as described above with reference to FIGS. 2B and 4B. In step 1602, the wavelengths impinge a planar, non-periodic, sub-wavelength grating, as described above with reference to FIGS. 11 and 12. In step 1603, each wavelength of light that strikes the grating is reflected toward one or two or more waveguides, each waveguide carrying one of the two or more wavelengths, as described above with reference to FIGS. 2B and 4B.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A multiplexer/demultiplexer system comprising:
an input/output waveguide;
two or more output/input waveguides; and
a planar, non-periodic, sub-wavelength grating, wherein the input/output waveguide and the two or more output/input waveguides are positioned on a common side of the planar, non-periodic, sub-wavelength grating such that, when the system is operated as a multiplexer, each wavelength of light output from one of the two or more output/input waveguides is reflected by the grating toward the input/output waveguide, and when the system is operated as a demultiplexer, each wavelength of light output from the input/output waveguide is reflected toward one of the two or more output/input waveguides.

2. The system of claim 1, wherein the input/output waveguide and the two or more output/input waveguides further comprise ridge waveguides.

3. The system of claim 1, wherein the input/output waveguide and the two or more output/input waveguides further comprises optical fibers.

4. The system of claim 3, wherein the optical fibers comprise respective termini, said system further comprising converging lenses disposed on the termini of the optical fibers, wherein each converging lens is to direct light reflected from the grating into the core of a corresponding optical fiber.

5. The system of claim 3, wherein air space separates the optical fibers from the grating.

6. The system of claim 1, wherein the grating is to reflect light with a substantially linear wavefront.

7. The system of claim 1, wherein the grating is to reflect light with a non-linear wavefront such that each of the two or more wavelengths has a focal point within one of the two or more waveguides.

8. The system of claim 1, wherein the grating further comprises a one-dimensional grating pattern.

9. The system of claim 1, wherein the grating further comprises a two-dimensional grating pattern.

10. A method for multiplexing two or more wavelengths of light, the method comprising:
transmitting two or more wavelengths of light, each wavelength transmitted in a separate input waveguide;
impinging each wavelength of light onto a planar, non-periodic, sub-wavelength grating, wherein each wavelength strikes the grating with a different angle of incidence; and
reflecting each wavelength of light that strikes the grating toward a single output waveguide, wherein the output waveguide carries the two or more wavelengths.

11. The method of claim 10, wherein reflecting each wavelength of light that strikes the grating further comprises reflecting each wavelength with a substantially linearly varying wavefront, each wavefront directed to the output waveguide.

12. The method of claim 10, wherein reflecting each wavelength of light that strikes the grating further comprises focusing each wavelength into the output waveguide.

13. A method for demultiplexing two or more wavelengths of light, the method comprising:
transmitting the two or more wavelengths of light in a single input waveguide;
impinging each wavelength of light onto a planar, non-periodic, sub-wavelength grating; and
reflecting each of the two or more wavelengths from the grating such that each wavelength enters one of two or more separate output waveguides.

14. The method of claim 13, wherein reflecting each wavelength of light that strikes the grating further comprises reflecting each wavelength with a substantially linearly varying wavefront.

15. The method of claim 13, wherein reflecting each wavelength of light that strikes the grating further comprises focusing each wavelength into one of the two or more waveguides.

* * * * *

UNITED STATES PATENT AND TRADEMARK OFFICE
CERTIFICATE OF CORRECTION

| | | |
|---|---|---|
| PATENT NO. | : 8,175,430 B2 | Page 1 of 1 |
| APPLICATION NO. | : 12/696958 | |
| DATED | : May 8, 2012 | |
| INVENTOR(S) | : Zhen Peng et al. | |

It is certified that error appears in the above-identified patent and that said Letters Patent is hereby corrected as shown below:

In the Specifications:

In column 4, line 47, delete "reflected" and insert -- optical fibers 304-306. For example, the fiber 304 is oriented so that the wavelength $\lambda_1$ is reflected --, therefor.

Signed and Sealed this
First Day of January, 2013

David J. Kappos
*Director of the United States Patent and Trademark Office*